A. TAYLOR & P. W. GRAY.
TELEMETER OR RANGE FINDER.
APPLICATION FILED NOV. 6, 1915.

1,281,703.

Patented Oct. 15, 1918.
4 SHEETS—SHEET 1.

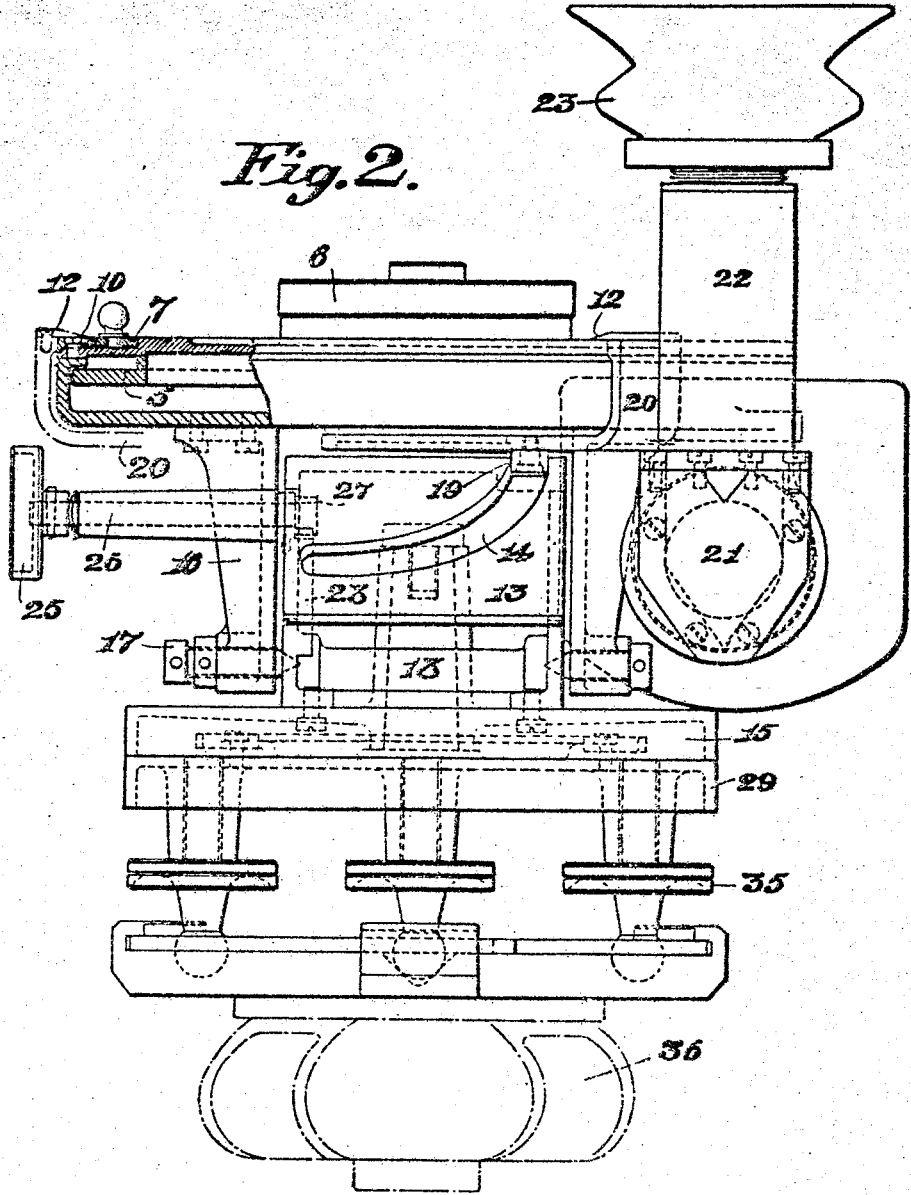

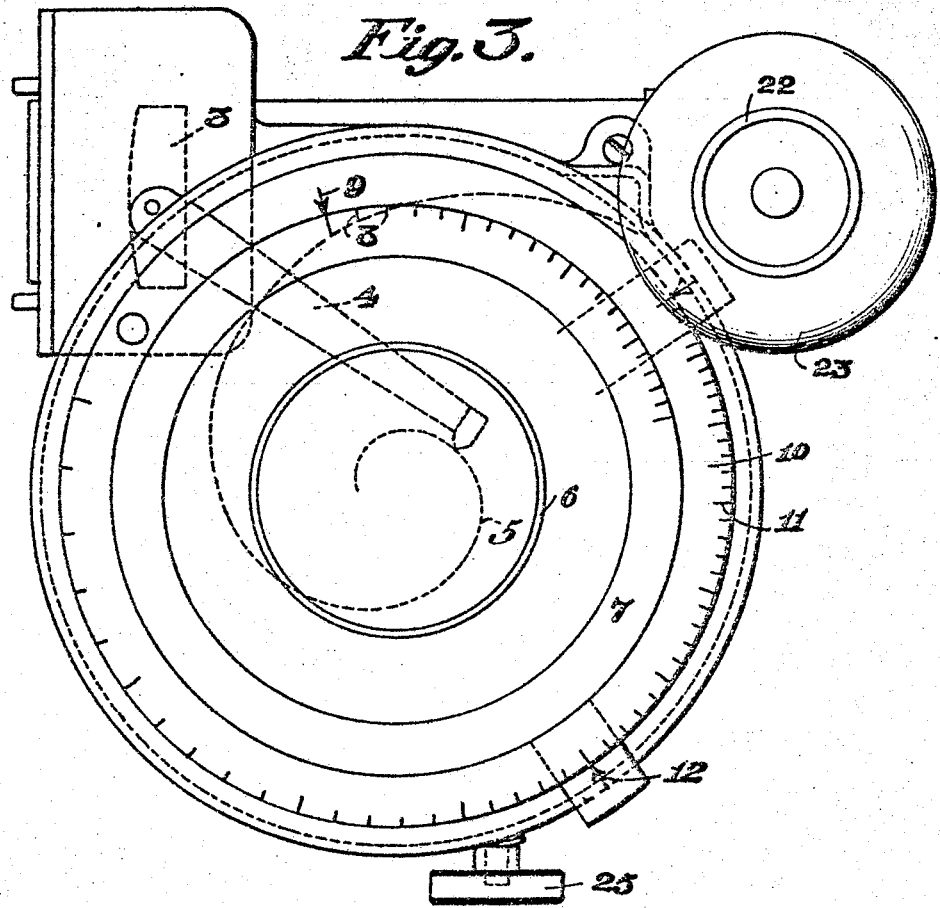
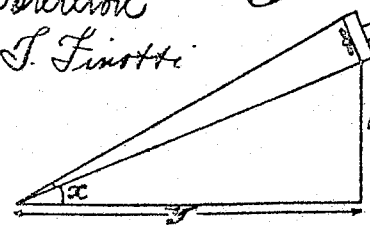

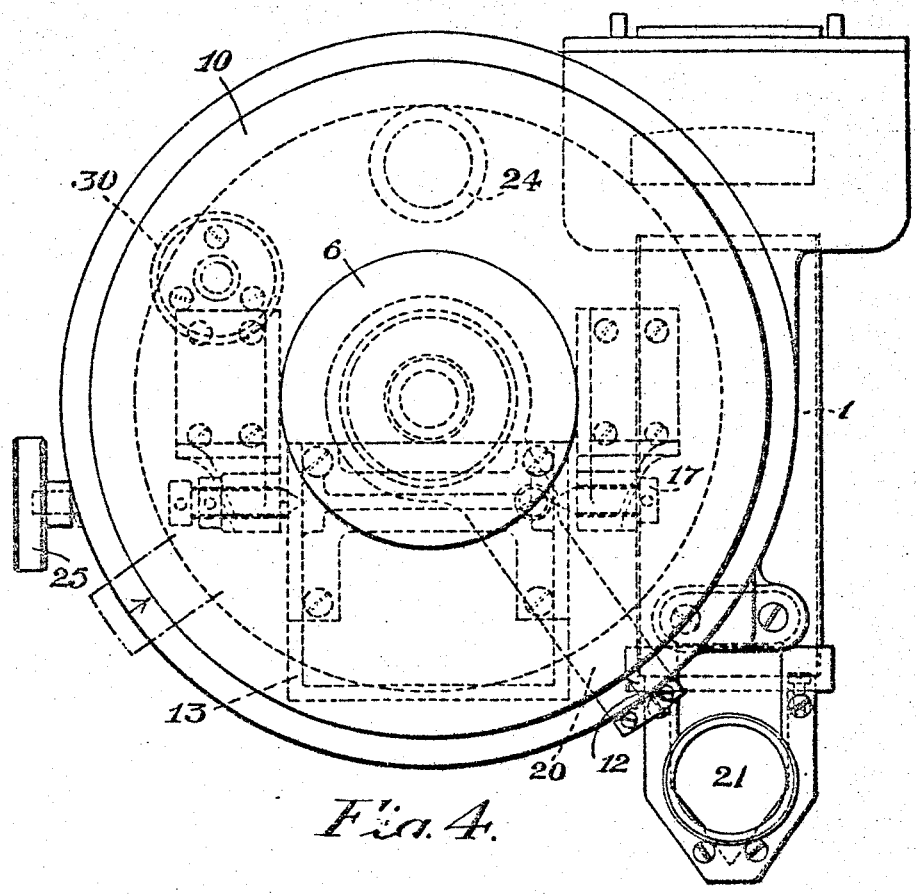

UNITED STATES PATENT OFFICE.

ALFRED TAYLOR AND PERCY WILLIS GRAY, OF YORK, ENGLAND.

TELEMETER OR RANGE-FINDER.

1,281,703.　　　　Specification of Letters Patent.　　Patented Oct. 15, 1918.

Application filed November 8, 1915. Serial No. 60,049.

*To all whom it may concern:*

Be it known that we, ALFRED TAYLOR and PERCY WILLIS GRAY, both subjects of the King of Great Britain, residing at York, in the county of York, in the Kingdom of England, have invented certain new and useful Improvements in Telemeters or Range-Finders, of which the following is a specification.

The present invention relates to improvements in telemeters, range finders and the like instruments.

According to the present invention means are provided whereby correction may be made from the range of a sighted point a certain distance vertically above the earth automatically to a horizontal range, that is to the horizontal distance from the range finder to a spot vertically below the observed object.

Such correction means are of particular utility in connection with range finders adapted for finding the range of aeroplanes or of other objects generally situated above the earth.

In the use of such range finders it will be perceived that there are two problems to be solved, first given a fixed base such as the width or height of a distant object, then by means of the range finder it is possible to ascertain the distance of the object. Then secondly, it is usually desirable to correct this value to obtain the horizontal range by multiplying this reading by the co-sine of the angle subtended by the object to the horizontal.

By means of the present invention an apparatus may be constructed which will directly solve by a single reading such a dual problem.

As a means for correction a cam cut in a co-sine curve is used so that, as the telescope of the range finder is inclined to sight an object out of the horizontal, so is the cam moved to adjust the relative position of the range dial and index. For instance, the index may be a movable one and have its position solely controlled by the position of said co-sine cam.

The present invention is more particularly described with reference to the accompanying drawings, in which:—

Fig. 2 is an end view corresponding to Fig. 1.

Fig. 3 is a plan view corresponding to Fig. 1 showing range finder parts and scale, while Fig. 4 is a plan view corresponding to Fig. 2 but showing the operating means for obtaining the correction with certain parts removed.

Fig. 5 is a diagrammatic view.

Figure 1:
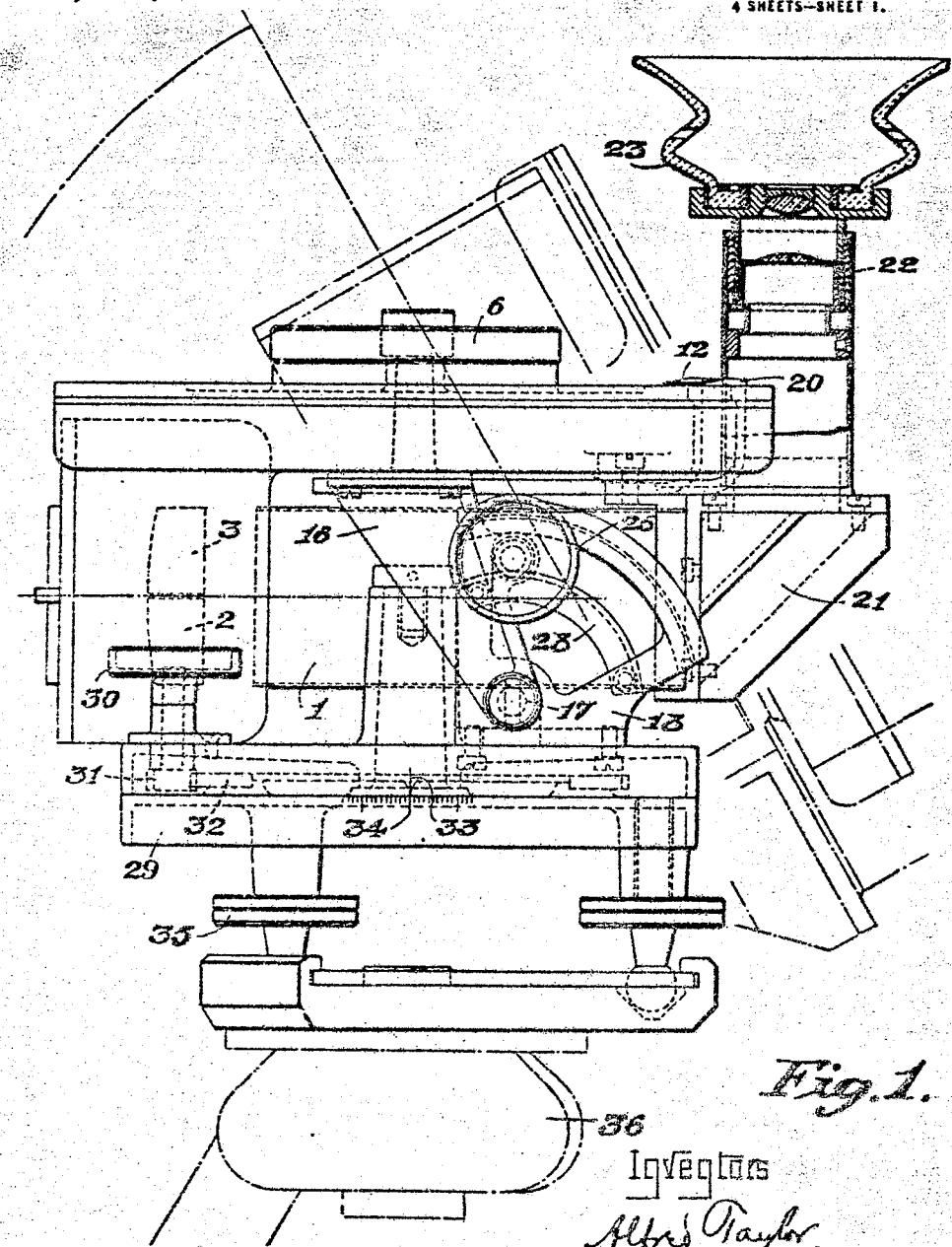
Figure 1 is a side elevation of one form of instrument.

The invention will be particularly described with reference to a divided object glass type of range finder, but it will be obvious that the improvements are generally applicable to other types such as those of swinging prisms or mirrors.

The telescope 1 is provided with a divided object glass consisting of a fixed portion 2 and a movable portion 3 which latter is directly connected or linked to an operating lever 4 (Fig. 3) which bears on an operating cam 5 preferably cut to a logarithmic curve so that by a simple displacement of the cam 5, for instance, by a milled head 6, the angle of observation $x$, Fig. 5 subtended will be proportional to a logarithmic co-efficient of the range observed such as, for instance the logarithmic tan of the observed angle $x$, which obviously is a function of the logarithm of the range $y$, Fig. 5.

Where the observed base is a fixed quantity it will be obvious that the range dial reading directly upon an index will be sufficient to solve the problem log of the observed base—log tan of the observed angle= log of the range.

Where however it is desired to use a base of varying length it will be desirable that the range dial should work directly in coöperation with one side of a logarithmic scale, the other side of which will coöperate with a leading index so that the trigonometric problem is still directly solvable. As shown in Fig. 3 the milled head 6 by which the displacement of the sighted element through an observed angle is obtained is directly connected to a scale 7, in the preferred form as shown of annular form, which is provided with graduations 8 to form a scale corresponding to the logarithmic co-efficients of various lengths of observed base, which scale coöperates with an index 9 on an annular scale 10 provided at its outer periphery with graduations 11 corresponding to the logarithmic co-efficients of the observed range, which scale 10 coöperates with an index 12. It will consequently be seen that by connecting together scales 7 and 10 when the index 9 is opposite a graduation 8 corresponding to the observed base, it will be possible by directly turning the milled head 6 to obtain a direct reading from the index 12 of the observed range.

When the observed base which is being sighted is for instance the aspect span of an aeroplane, the sighting element will be displaced so that one wing tip is observable through the fixed side of the object glass while the other wing tip is brought in line with it by displacement of the movable object glass half. It will be seen therefore that the observed range would be accurately correct for a right-angle triangle, but as the observed base is so small usually relatively to the range, this may be neglected and the two sides of the observed triangle become equal to the range. This range however is still not a correct one for the horizontal distance of the observed object from the observing station whenever the sighted object, for instance, an aeroplane, is above the ground. Consequently this reading has to be corrected. For this purpose a cam cut to a co-sine curve is provided connected to the range scale or its index to automatically correct the observed reading.

In the form shown a segment of a cylinder 13 provided with a cam slot 14 cut to a co-sine curve is mounted on a base 15 of the instrument and the telescope or like sighting element with the scales is mounted to move relatively thereto. The movable part consisting of scales and sighting element is carried by arms 16 provided with set screws 17 acting as pivots about the base 18 carrying the cylinder 13 and a pin or roller 19 is provided engaging in the cam slot 14 and connected to an arm 20 on which the index 12 is carried. It will be seen therefore that by simply moving the sighting part of the instrument and scales relatively to the base 15 so that the line of sight follows the observed object at varying heights above the ground, the indicating range is always corrected automatically by a displacement of the index 12. It is obvious that instead of displacing the index 12 the range scale 10 may be connected to the pin 19 to coöperate with the fixed index.

To allow the observer to follow more evenly the moving observed object and provide for more convenient handling of the instrument, the telescope parts are turned through a right-angle and a deflecting prism 21 is provided at the angle so that, as shown in Figs. 1 and 2, the eyepiece 22 which may be of any usual construction, lies at right-angles to the main body of the telescope. An eye-shield of rubber or the like 23 may be provided on the eyepiece 22.

The eyepiece 22 may in a preferred form of construction, if desired, be provided with means for magnifying the image so that a large field of view is observed which will facilitate the sighting of the object when the same occupies only a small space in a large field of view. A spirit level 24 is provided to show when the sighting element lies in a truly horizontal plane so that adjustments of the instrument may be effected.

To displace the sighting element relatively to the base 15 with greater accuracy an elevating device consisting for instance of a milled head 25 on a spindle 26 which carries a pinion 27 meshing with a fixed gear segment 28 mounted on the base 18, is provided on the sighting element so that this may be deflected through an angle into any position between predetermined limits, for instance, into the angle as indicated by dotted lines in Fig. 1.

The whole sighting element with base 15 is movable in azimuth about a lower supporting azimuth frame 29, thus displacing the range finder bodily in a horizontal plane. A milled head 30 is provided, the spindle of which carries a pinion 31 engaging with a rack 32 fixed to the azimuth frame 29. An index 33 coöperating with a scale 34 indicates the angular displacement in azimuth of the range finder.

The azimuth frame 29 is carried by leveling screws 35 so that the instrument may be leveled on its tripod or like support 36 which leveling can be checked, as previously indicated, by means of a spirit level 24.

Means may of course be provided as is usual for the zero setting of the fixed portion of the object glass and also for zero setting of the scales of the range finder instrument.

It is also obvious that instead of the provision of variable magnifying eyepiece for the purpose of quickly sighting an object in a large field, several sights may be disposed at suitable points on the instrument.

The instrument of the present invention has particular utility in the sighting of guns by means of observing aeroplanes. In one method of range finding an aeroplane will proceed until it comes to a position vertically above the spot the horizontal range of which is desired. A signal such as the waving of a flag, dropping of a smoke bomb or the like is then given from the aeroplane which will be observed at the base point at which the range finder is stationed. The aeroplane at that time would desirably be head on to the base point so that its width from one wing tip to the other wing tip may be used as a fixed base in the finding of the range. Alternatively, of course it may be decided upon to use the length of the aeroplane as a base, in which case this latter should be traveling at right-angles to the direction of sighting of the range finder.

In use the aeroplane is kept in view through the telescope and the range finder. Directly a smoke bomb or other signal is made by the aeroplane; by means of the cam or the like the movable half of the object glass and range dial connected to it, is deflected until the left-hand tip for instance of the wing of the aeroplane of the right-hand image in the object glass will coincide with the right hand tip of the wing of the left hand image. The displacement of the moving half of the object glass required to produce this result thus determines the angle, from which the length of the wings being known, the range or the distance of the aeroplane is automatically indicated.

In certain cases it may be more convenient to use a cam cut to a secant or $\frac{1}{co\text{-}sine}$ curve instead of a co-sine curve cam.

It is obvious that in certain cases it may be desirable to reflect the line of sight through a further range, in such instances where the observer may desire to take cover from the object under observation, that is to say, that periscopic attachment may be applied to the aeroplane range finder constructions above outlined.

We declare that what we claim is:—

1. A telemeter comprising a sighting element, means to indicate the displacement of the sighting element in terms of the distance from the instrument of the object sighted above a horizontal plane containing the instrument, and a cam operative on said indicator to correct its reading to the corresponding range of the observed object when projected on said horizontal plane.

2. A telemeter comprising a sighting element, means to indicate the displacement of the sighting element in terms of the distance from the instrument of the object sighted above a horizontal plane containing the instrument, and a cam cut to a cosine curve operative on said indicator to correct its reading to the corresponding range of the observed object when projected on said horizontal plane.

3. A telemeter comprising a sighting element, a scale indicating the displacement of the sighting element in terms of the distance from the instrument of the object sighted, an index operating on said scale, and a cam cut to a cosine curve operating on said index to displace it relatively to said scale to correct the reading to the corresponding range of the observed object when projected on a horizontal plane containing the instrument.

4. A telemeter comprising a sighting element, a base or body carrying said element, a pair of logarithmic scales, means to connect one of said scales to the sighting element, an index operative on the other scale and a cam cut to a co-sine curve operating on said index to displace it relatively to said scale to correct the reading to the corresponding range of the observed object when projected on a horizontal plane containing the instrument.

5. A telemeter comprising a sighting element, a base or body carrying said element, a cam adapted to displace said sighting element, a logarithmic scale connected to said cam, a second logarithmic scale coöperating with said first scale, an index operating on said second scale, and a cam cut to a co-sine curve operating on said index to displace it relatively to said scale to correct the reading to the corresponding range of the observed object when projected on a horizontal plane containing the instrument.

6. A telemeter comprising a sighting element, a base or body, pivots on said body carrying said element, a cam, means interconnecting said cam and said pivoted element whereby rotation of said cam displaces said element about its pivots, a logarithmic scale connected to said cam, a second logarithmic scale coöperating with said first scale, an index operating on said second scale, and a cam cut to a co-sine curve operating on said index to displace it relatively to said scale to correct the reading to the corresponding range of the observed object when projected on a horizontal plane containing the instrument.

7. A telemeter comprising a sighting element, a body carrying said element, an indicator to normally indicate the displacement of said element relatively to the body when viewing an object above a horizontal plane containing the instrument, a base, pivotal means supporting said body on said base, a cam mounted on said base, and means connecting said cam and said indicator to adjust its reading according to the displacement of said body about the cam on the base.

8. A telemeter comprising a sighting element, a body carrying said element, an indicator to normally indicate the displacement of said element relatively to the body when viewing an object above azimuth, a base, pivotal means supporting said body on said base, and a cam cut to a co-sine curve operative on said indicator to correct its reading to the corresponding range of the observed object when projected on a horizontal plane containing the instrument.

9. A telemeter comprising a sighting element, a body carrying said element, a pair of logarithmic scales, means to connect one of said scales to the sighting element, an index operative on the other scale, a pin on said index, a base, pivotal means supporting said body on said base, a cam cut to a co-sine curve mounted on said base, and means to guide said pin along said cam when the body is swung on said base to view any object above the horizontal plane containing the instrument.

10. A telemeter comprising a sighting element, a body carrying said element, a cam adapted to displace said sighting element relatively to said body, a logarithmic scale mounted on said cam, a second scale coöperating with said first scale, an index operating on said second scale, a base, pivotal means supporting said body on said base, a pin on said index, a cam cut to a co-sine curve mounted on said base, and means to guide said pin along said cam when the body is swung on said base to view any object above the horizontal plane containing the instrument.

11. A telemeter comprising a sighting element, a base or body carrying said element, an indicator to normally indicate the displacement of the sighting element relatively to the base or body in terms of the range of the object sighted, means interposed between said indicator and said sighting element to correct the indication to a range in a horizontal plane containing the instrument whenever the sighting plane is deviated from said horizontal plane, a frame, and means to rotate said body about said frame in said horizontal plane.

12. A telemeter comprising a sighting element, a base or body carrying said element, a pair of logarithmic scales, means to connect one of said scales to the sighting element, an index operative on the other scale, a cam cut to a co-sine curve operating on said index to displace it relatively to said scale to correct the reading to the corresponding range of the observed point in a horizontal plane containing the instrument, a frame, and means to rotate said body about said frame in said horizontal plane.

13. A telemeter comprising a sighting element, a body carrying said element, a pair of logarithmic scales, means to connect one of said scales to the sighting element, an index operative on the other scale, a pin on said index, a base, pivotal means supporting said body on said base, a cam cut to a co-sine curve mounted on said base, means to guide said pin along said cam when the body is swung on said base, a frame, and means to rotate said body about said frame in a horizontal plane containing the instrument.

14. A telemeter comprising a sighting element, a body carrying said element, an indicator to normally indicate the displacement of said element relatively to the body when viewing an object above azimuth, a base, pivotal means supporting said body on said base, a cam mounted on said base, means connecting said cam and said indicator to adjust its reading according to the displacement of said body about the cam on the base whenever the object viewed lies above the horizontal plane containing the instrument, and rack and pinion means to displace said body accurately about said base.

15. A telemeter comprising a sighting element, a base or body carrying said element, an indicator to normally indicate the displacement of the sighting element relatively to the base or body in terms of the range of the object sighted, means interposed between said indicator and said sighting element to correct the indication to a range in a horizontal plane containing the instrument whenever the sighting plane is deviated from said horizontal plane, and means to deviate the line of sight through said sighting element through an angle.

16. A telemeter comprising a sighting element, a base or body carrying said element, an indicator to normally indicate the displacement of the sighting element relatively to the base or body in terms of the range of the object sighted, means interposed between said indicator and said sighting element to correct the indication to a range in a horizontal plane containing the instrument whenever the sighting plane is deviated from said horizontal plane, and a pancratic eyepiece in the line of sight of said sighting element.

In witness whereof, we have hereunto signed our names this 20th day of October 1915, in the presence of two subscribing witnesses.

ALFRED TAYLOR.
PERCY WILLIS GRAY.

Witnesses:
ALFRED PROCTER,
CHARLES DOWNEY, Jr.

Copies of this patent may be obtained for five cents each, by addressing the "Commissioner of Patents Washington, D. C."